UNITED STATES PATENT OFFICE 2,352,552

CONDENSATION PRODUCTS OF UREA AND AMINES

Jean André Paul Kienzlé, Nogent sur Oise, France; vested in the Alien Property Custodian No Drawing. Application June 4, 1940, Serial No. 338,782. In France July 8, 1939

11 Claims. (Cl. 260—2)

This invention relates to novel nitrogen compounds, to a process for their production and to their commercial applications.

It has been found according to the present invention that it was possible to obtain novel nitrogen compounds of precious commercial interest by causing urea to react upon an amine containing one or more alcoholic OH-groups and by converting the nitrogen of the starting amine at least partially into quaternary ammonium before or after this reaction, the operating method being such that either the one or the other of these reactions can be preceded or accompanied or followed by condensations with aldehydes.

As amines containing one or more alcoholic OH-groups can be used, for example, the monoethanolamine, the diethanolamine, the N-methyldiethanolamine, the triethanolamine, the tripropanolamine, the N-hydroxyethyl diethylamine of the formula

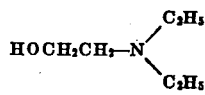

the N-di(beta hydroxyethyl) aniline of the formula

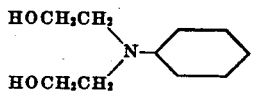

the N-beta, gamma dihydroxypropylethyl aniline of the formula

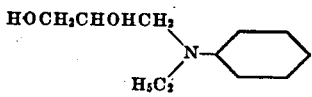

and the N-beta gamma dihydroxypropyl di-(beta hydroxyethyl) amine of the formula

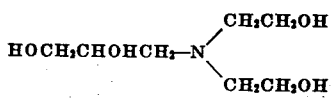

These amines are first converted at least partially into quaternary ammonium derivatives, as will be explained hereinafter, or previously condensed with urea. The condensation with urea can take place by a simple heating of the constituents preferably at temperatures comprised between 100 and 250° C., the reaction being the more rapid the higher the temperature is.

The conversion of the nitrogen of the starting amine at least partially into quaternary ammonium is effected through a treatment of the amine or of a condensation product of this amine with urea by means of an ester of an inorganic acid; as ester of inorganic acid may be used the sulphate of methyl, the chloride of ethyl, the chloride of amyl, the chloride of dodecyl, the chloride of cetyl, the chloride of benzyl, the chloride of ethylene, the bromide of ethylene and other similar esters.

When the starting amine is a tertiary amine, the above mentioned treatment determines the addition of the ester of inorganic acid on the tertiary nitrogen and the conversion of the latter into quaternary ammonium; when the starting amine is a primary or a secondary amine, an alkylation or aralkylation of the nitrogen is probably produced followed by the addition, at least partially, of the ester of inorganic acid on the so formed tertiary nitrogen and the conversion of the latter, at least partially, into quaternary ammonium.

According to the constitutions of the starting amine or of its condensation product with urea and of the inorganic ester, the conversion takes place already at the ordinary temperature or must be effected at temperatures as high as 200° C. In order to homogenize the reaction body, it may be desirable to add to the same a solvent such as methyl or ethyl alcohol. According to the reaction temperature and the boiling point of the ester of inorganic acid, it can be necessary to effect the operation in an autoclave or in a closed vessel. In the case of a primary or secondary amine, it may be advantageous to add an acid absorbing agent in order to facilitate the alkylation or the aralkylation.

These reactions may be combined with condensations with aldehydes or products capable of forming aldehydes in any step of the production. It is possible, for example, to condense the urea and the hydroxylated amine in presence of trioxymethylene and then to treat the obtained condensation product with the ester of inorganic acid or to condense the reaction product "hydroxylated amine-urea" with an aldehyde and then to treat it with the ester of inorganic acid or to condense either the reaction product "(hydroxylated amine-urea)-ester of inorganic acid" or the reaction product "(hydroxylated amine-ester of inorganic acid)-urea" with an aldehyde.

The products obtained according to the invention form quaternary ammonium salts which are rather soluble in water and can be used as gluing agents and as subsidiary products in the industries of textiles, paper, leather, dyestuffs etc. They form, for example, excellent agents for improving the solidities of substantive dyes against water, for increasing the affinity of cellulosic fibres for acid dyestuffs, for the fixation of dyestuffs containing acid groups in paper pulp, for the precipitation or fixation of natural and synthetic tannins in leather, for the agglomeration of pulverulent substances such as coals, building materials, etc., in the cold and under pressure.

The following are non-limitative examples. In these examples the proportions of the materials used are given by weight.

*Example 1*

30 parts of triethanolamine and 50 parts of urea are heated at 135–140° C. until an evolution of ammonia is no longer produced. A bright yellow very viscous condensation product is formed. The said product is allowed to cool at 60–70° C., 25 parts of ethyl alcohol are added and the solution is treated while stirring with 27 parts of sulphate of methyl. After distillation of the alcohol the reaction product is obtained in the form of a very viscous mass, which is readily soluble in water.

When a cotton fabric dyed by means of a direct dyestuff is treated with this solution the dye becomes particularly solid against water.

*Example 2*

By treating the reaction product obtained according to Example 1 with formic aldehyde, according to the concentration, the duration of the reaction and the proportion of formic aldehyde which has been used, amorphous products of a syrupy or resinous consistency are obtained. These products are also soluble in water.

*Example 3*

30 parts of triethanolamine are treated with precaution with 27 parts of sulphate of methyl. 36 parts of urea are then added and the mixture is heated at 140–150° C. until the evolution of ammonia has almost completely ceased. A reaction product is obtained which is rather fluid, almost colourless and readily soluble in water. This product can also be treated with formic aldehyde either as such or in an aqueous medium. According to the concentration it is possible to obtain either amorphous solid products which can be dried and pulverized or perfectly stable solutions.

*Example 4*

30 parts of triethanolamine and 36 parts of urea are heated while stirring at 120–130° C. until the evolution of ammonia has completely ceased. 6 g. of trioxymethylene are then added and allowed to react at the same temperature during about one hour. This mixture is then treated with 25 parts of benzyl chloride and the temperature caused to rise up to 140–150° C., and maintained until all the benzyl chloride has completely disappeared. On cooling, a reaction product is obtained in the form of a brownish solid material rather soluble in water.

*Example 5*

50 parts of condensation product triethanolamine-urea (according to Example 1) are treated under pressure with 22 parts of amyl chloride at a temperature of 140–150° C. during about ten hours. The reaction product is dissolved in a small amount of water and the amyl chloride which has not reacted is decanted.

The so obtained solution precipitates particularly the substantive dyestuffs.

The properties of the product can still be improved by treating the aqueous solution of the product with formol of 40% at the temperature of the water-bath.

*Example 6*

30 parts of the condensation product triethanolamine-urea (according to Example 1) and 20 parts of ethylene bromide are heated while stirring at 125–130° C. until the ethylene bromide has disappeared. A product is obtained which is almost colourless and readily soluble in water. The properties are similar to those of the product obtained according to Example 5.

*Example 7*

30 parts of triethanolamine and 10 parts of ethylene chloride are heated while stirring at 80–90° C. until the ethylene chloride has disappeared. 36 parts of urea are then added and the temperature is caused to rise up to 130–140° C. This temperature is maintained until the evolution of ammonia has ceased. A product is thus obtained which is slightly brownish, soluble in water and suitable for improving the solidities of direct dyestuffs. A treatment with formol renders the product still more efficient.

*Example 8*

21 parts of diethanolamine and 35 parts of urea are heated at 140–145° C. until the evolution of ammonia has disappeared. This mixture is then allowed to cool at 70–80° C. and 26 parts of methyl sulphate are added drop by drop while stirring. The reaction product is dissolved in water, eventually neutralized with sodium carbonate and treated in the water-bath during very short time with formol of 40%.

*Example 9*

36 parts of N-di(beta hydroxyethyl) aniline and 35 parts of urea are heated at 150–160° C. When the evolution of ammonia has become very weak, the mixture is cooled and 26 g. of methyl sulphate are added at the temperature of 70–80° C. The slightly brown reaction product is for the most part soluble in water as well as the product of the reaction with formol. It precipitates particularly the substantive dyestuffs from their aqueous solution.

*Example 10*

24 parts of N-hydroxyethyl-diethylamine and 18 parts of urea are heated with reflux and while stirring at 140–145° C. When the evolution of ammonia has ceased the mixture is allowed to cool at about 70° C. and 27 parts of methyl sulphate are added drop by drop while energetically stirring. The reaction product appears in the form of a viscous liquid which is almost colourless and very soluble in water.

*Example 11*

20 parts of N-beta, gamma dihydroxypropyl-ethyl aniline and 14 parts of urea are heated at 150–170° C. When there is no longer an evolution of ammonia, the mixture is allowed to cool at 80° C., 30 cc. of ethyl alcohol are added and the solution is treated with 13 parts of methyl sulphate which are added drop by drop, the alcohol is distilled and the solution is further heated during about one hour at 100–110° C. The bright brown reaction product is very viscous and for the most part soluble in water. It can also be treated subsequently with formol.

Example 12

30 parts of mono-ethanolamine and 30 parts of urea are heated at 130–140° C. until the evolution of ammonia has ceased. The mixture is then allowed to cool at about 70° C. and 120 parts of methyl sulphate are added drop by drop. When all the methyl sulphate has been introduced, 50 parts of sodium carbonate are added in small fractions while stirring energetically. The reaction product is bright brown and readily soluble in water. The methyl sulphate can be advantageously partially substituted by benzyl chloride.

Example 13

| | Parts |
|---|---|
| Triethanolamine | 30 |
| Urea | 36 |
| Trioxymethylene | 6 | are heated while stirring until there is no longer an evolution of ammonia. 25 g. of benzyl chloride are then added, the temperature is caused to rise up to 140–150° C. and this temperature is maintained until the benzyl chloride has completely disappeared. On cooling a reaction product is obtained in the form of a brownish solid material rather soluble in water.

By treating in the cold a dye on cotton made by means of a direct dyestuff with the aqueous solution of this condensation product the solidities of this dye are considerably improved.

Example 14

30 parts of triethanolamine are treated cautiously with 27 parts of methyl sulphate. 50 parts of urea are then added and the mixture is heated at 160–170° C. until the evolution of ammonia has almost completely ceased. The so obtained product is condensed with 20 parts of crotonic aldehyde at the temperature of the water-bath during about two hours; the product is then diluted with water. A homogeneous yellowish solution is obtained which fixes the direct dyestuffs on the fibre.

Example 15

In the foregoing example the 20 parts of crotonic aldehyde are substituted by 25 parts of furfurol; a similar but deeper coloured product is obtained.

Example 16

A cotton fabric is impregnated with a solution of 20% of the product described in the Example 2. The fabric is dehydrated and then dried during very short time at 100–120° C. The so treated fabric fixes the acid dyestuffs in a neutral or weakly acetic acid bath at a temperature of 40–70° C.

Example 17

100 parts by weight of hides tanned with vegetable tannin are treated after setting out or pressing and dressing with a solution of 5 parts of the product of Example 2 in 100 parts of water at the ordinary temperature during fifteen to twenty minutes. The hides are allowed to drain in order to remove the excess of solution and then treated with a diluted solution of a synthetic tannin having a good bleaching power.

What I claim is:

1. A process for obtaining nitrogen compounds which comprises heating to cause urea to react upon an amine containing at least one alcoholic OH-group and converting the nitrogen of the starting amine at least partially into quaternary ammonium, by means of a member of the group consisting of the alkyl and aralkyl esters of inorganic acids.

2. A process for obtaining nitrogen compounds which consists in converting at least partially into quaternary ammonium by means of a member of the group consisting of the alkyl and aralkyl esters of inorganic acids the nitrogen of an amine containing at least one alcoholic OH-group and then in causing urea to react upon said amine by heating.

3. A process for obtaining nitrogen compounds which consists in heating to cause urea to react upon an amine containing at least one alcoholic OH-group and then in converting the nitrogen of the starting amine at least partially into quaternary ammonium, by means of a member of the group consisting of the alkyl and aralkyl esters of inorganic acids.

4. A process for obtaining nitrogen compounds which consists in condensing by heating urea and an amine containing at least one alcoholic OH-group in presence of an aldehyde and then in converting the nitrogen of the starting amine at least partially into quaternary ammonium, by means of a member of the group consisting of the alkyl and aralkyl esters of inorganic acids.

5. A process for obtaining nitrogen compounds which consists in heating to cause urea to react upon an amine containing at least one alcoholic OH-group, in condensing the product of this reaction with an aldehyde and then converting the nitrogen of the starting amine at least partially into quaternary ammonium, by means of a member of the group consisting of the alkyl and aralkyl esters of inorganic acids.

6. A process for obtaining nitrogen compounds which consists in heating to cause urea to react upon an amine containing at least one alcoholic OH-group, in converting the nitrogen of the starting amine at least partially into quaternary ammonium by means of a member of the group consisting of the alkyl and aralkyl esters of inorganic acids, and then in condensing the product of the latter reaction with an aldehyde.

7. A process for obtaining nitrogen compounds which consists in converting at least partially into quaternary ammonium by means of a member of the group consisting of the alkyl and aralkyl esters of inorganic acids the nitrogen of an amine containing at least one alcoholic OH-group, in heating to cause urea to react upon said amine, and then in condensing the product of the latter reaction with an aldehyde.

8. As new products, the nitrogen compounds obtained by the process according to claim 1.

9. As new products, the nitrogen compounds obtained by the process according to claim 2.

10. As new products, the nitrogen compounds obtained by the process according to claim 5.

11. As new products, the nitrogen compounds obtained by the process according to claim 6.

JEAN ANDRÉ PAUL KIENZLÉ.